United States Patent [19]
Noh

[11] Patent Number: 5,786,890
[45] Date of Patent: Jul. 28, 1998

[54] OPTICAL OUTPUT DETECTOR

[75] Inventor: Sung Woo Noh, Seoul, Rep. of Korea

[73] Assignee: LG Electronics Inc., Seoul, Rep. of Korea

[21] Appl. No.: 762,970

[22] Filed: Dec. 6, 1996

[30]     Foreign Application Priority Data

Mar. 22, 1996 [KR] Rep. of Korea ............ 7942/1996

[51] Int. Cl.$^6$ ................................................ G11B 7/135
[52] U.S. Cl. .................... 356/225; 250/205; 369/116
[58] Field of Search ................ 250/205; 369/116; 356/225

[56]         References Cited

U.S. PATENT DOCUMENTS 5,475,210  12/1995  Taguchi et al. ............ 250/205

*Primary Examiner*—Richard A. Rosenberger
*Attorney, Agent, or Firm*—John P. White; Cooper & Dunham LLP

[57]         ABSTRACT

An optical output detector suitable for detecting the output of a laser diode for emitting light in a constant direction. The front emitted light generated from the laser diode as a light emitter is partially detected by a transmitting and diffracting unit, and the light intensity of the light emitter can be constantly maintained by detecting the light, thereby simplifying the manufacturing process and reducing the cost. Also, optical data can be stably processed by enhanced efficiency of the laser diode.

10 Claims, 4 Drawing Sheets

5,786,890

1

OPTICAL OUTPUT DETECTOR

BACKGROUND OF THE INVENTION

The present invention relates to an optical output detector, and more particularly, to an optical output detector suitable to detect the output of a laser diode (LD) for emitting light in a constant direction.

Hereinbelow, a conventional optical output detector will be described with reference to accompanying drawings.

The conventional output detector, as shown in FIG. 1, includes a laser diode 1 for generating a front emitted light and a rear emitted light, a hologram element 2 for transmitting the front emitted light from the laser diode 1 and diffracting reflected light, an optical recording disk 3 onto which information is recorded, an objective lens 4 for focusing emitted light transmitted from the hologram element 2 or transferring the reflected light generated from the optical recording disk 3 to the hologram element 2, a signal detecting photo diode 5 for receiving diffracted light generated from the hologram element 2 and reading information of the optical recording disk 3, a power monitoring photo diode 6 for receiving the rear emitted light from the laser diode 1 and generating a control signal, and a driver 7 for receiving the control signal from the power monitoring photo diode 6 and outputting a driving signal of the laser diode 1 so that the laser diode 1 maintains a constant output level.

The operation of the optical output detector according to the prior art is performed such that the front emitted light generated from the laser diode 1 is transmitted via the hologram element 2 to then be incident into the data-storing optical recording disk 3 by means of the objective lens 4.

At this time, the reflected light representing the data stored in the optical recording disk 3 is reflected in a reverse direction.

The reflected light shown by reading the data of the optical recording disk 3 is focused by the objective lens 4 to then be incident into the hologram element 2.

The hologram element 2 diffracts the reflected light focused by the objective lens 4 to generate a diffracted is light, which is incident into the signal detecting photo diode 5. Then, the signal detecting photo diode 5 detects the light amount of the diffracted light to read the data recorded onto the optical recording disk 3.

The laser diode 1 generates a front emitted light and at the same time generates a rear emitted light having the same magnitude as that of the front emitted light but reverse to the front emitted light in its traveling direction, to be incident into the power monitoring photo diode 6, and outputs a control signal to the driver 7.

Then, the driver 7 drives the laser diode 1 with a constant output signal so that the laser diode 1 maintains constant emitted light.

In other words, the laser diode 1 is controlled to maintain constant emitted light, by detecting the light intensity of the rear emitted light incident into the power monitoring photo diode 6.

The aforementioned conventional optical output detector necessarily uses the power monitoring photo diode 6 to maintain the constant emitted light of the laser diode. Therefore, the fabrication process thereof becomes complicated, the module becomes bulky and the shape is intricate.

Further, when the rear emitted light is generated, the amount of the front emitted light is reduced, which makes it difficult to utilize the output of the laser diode efficiently.

2

In order to overcome these shortcomings, conventionally, the diffracted light incident into the signal detecting photo diode was used. However, the diffracted light is generated only at a state where the optical recording disk is inserted. Thus, without the optical recording disk, the driver may operate erroneously, by which the laser diode is liable to be damaged.

Further, since the reflectance of the optical recording disk is different depending upon the product, the precise operation is hard to predict.

SUMMARY OF THE INVENTION

To solve the aforementioned problems, it is an object of the present invention to provide an optical output detector which maintains a constant light intensity of emitted light by detecting the light diffracted from partial emitted light of a laser diode for emitting light in one direction.

To accomplish the above objects, there is provided an optical output detector comprising: a light emitting portion for emitting light in one direction; a transmitting and diffracting portion for transmitting the light and diffracting the same in one direction; a detecting portion for detecting the diffracted light; and a driving and controlling portion for amplifying the output of the detecting portion and maintaining the light of the light emitting portion constantly. Therefore, the light efficiency is improved and the light can be emitted stably.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

The concept of the present invention, adoptable for a reading device for reproducing an optical disk, lies in that a part of front emitted light generated from a light emitter as a laser diode is detected by a transmitting and diffracting unit as a filtering means, and the light intensity of the light emitter is maintained constantly by detecting the light.

Figure 1:
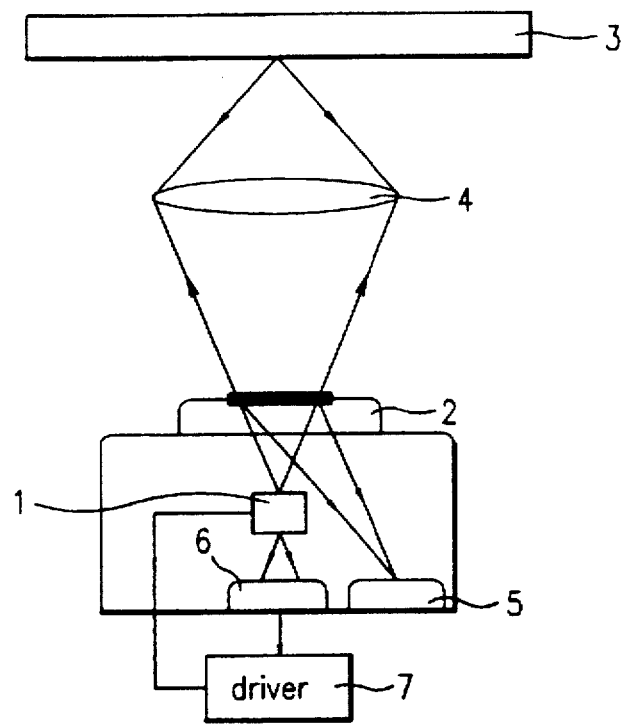
FIG. 1 is a schematic diagram of a conventional optical output detector.
Figure 2:
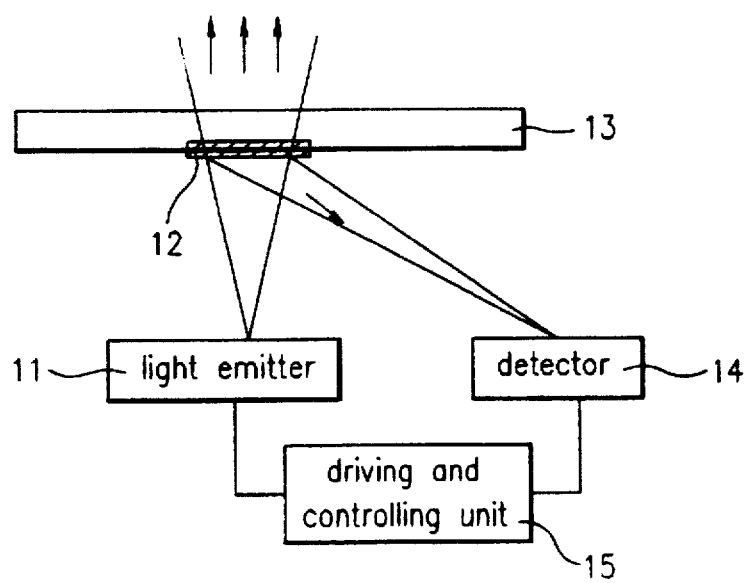
FIG. 2 is a schematic diagram showing the principle of an optical output detector according to the present invention.

In detail, according to the present invention, the optical output detector, as shown in FIG. 2, includes a light emitter 11 for generating light emitted in one direction, a transmitting and diffracting unit 12 as a hologram element for transmitting most of the light emitted in one direction and diffracting parts of the emitted light, a glass 13 of a predetermined thickness, having the transmitting and diffracting unit 12 formed internally or in one surface thereof, a detector 14 for detecting light reflected by the transmitting and diffracting unit 12, and a driving and controlling unit 15 for variably amplifying the light detected by the detector 14 in a constant strength, comparing the same with a signal for operating the light emitter 11 in an absolute ratio, and driving and controlling the emitted light of the light emitter 11 to be maintained constantly.

The operation of the present invention will now be described. First, the light emitter 11 is operated by the driving and controlling unit 15, so that the light emitter 11 irradiates the light emitted in one direction toward the glass 13 having a predetermined thickness.

More than 90% of the emitted light of the light emitter 11 is transmitted by the transmitting and diffracting unit 12 formed internally or in one surface of the glass 13, and remaining emitted light is diffracted in a constant ratio.

At this time, the diffracted light is reflected at a predetermined angle with respect to one plane of the glass 13.

The thus-diffracted light is sensitively detected by the detector 14 as a photo diode and is output as a predetermined electrical signal.

The signal output from the detector 14 is variably amplified in a constant strength by the driving and controlling unit 15, and is compared with the signal initially operating the light emitter 11 to drive and control such emitter so that the emitted light of the light emitter 11 is maintained constantly.

Further, if parts of the emitted light are reflected by using a mirror fixed on a predetermined area of the transmitting and diffracting unit 12 and having a constant reflectance, instead of reflecting light by the diffraction of the transmitting and diffracting unit 12, the reflected light is detected by the detector 14, and variably amplified in a constant strength by the driving and controlling unit 15. Then, the amplified light is compared with the signal initially operating the light emitter 11 and is controlled so that the emitted light of the light emitter 11 is maintained constantly.

Now, various embodiments of the present invention will be described based on the aforementioned optical output detector.

FIRST EMBODIMENT

Figure 3:
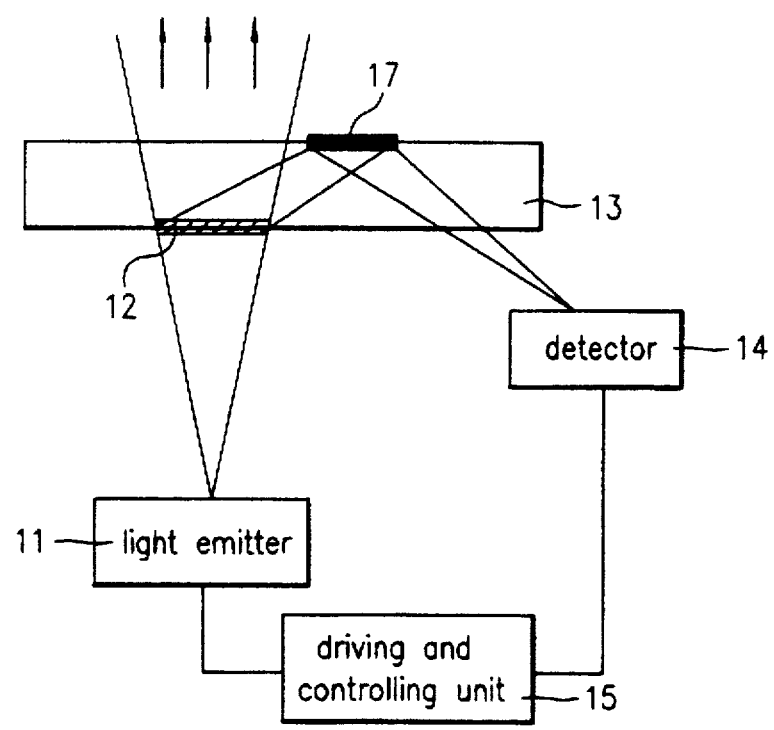
FIG. 3 is a schematic diagram of an optical output detector according to a first embodiment of the present invention.

As shown in FIG. 3, the optical output detector according to a first embodiment of the present invention includes a light emitter 11 for generating light emitted in one direction, a transmitting and diffracting unit 12 for transmitting most of the light emitted in one direction and diffracting parts of the emitted light, a glass 13 of a predetermined thickness, having the transmitting and diffracting unit 12 formed internally or in one surface thereof, a reflector 17 opposed to the transmitting and diffracting unit 12 formed on the glass 13 for reflecting the diffracted light of the transmitting and diffracting unit 12 at a constant angle, a detector 14 for detecting the light reflected by the reflector 17, and a driving and controlling unit 15 for variably amplifying the light detected by the detector 14 in a constant strength, comparing the same with a signal for operating the light emitter 11 in an absolute ratio, and driving and controlling the emitted light of the light emitter 11 to be maintained constantly.

The operation of the present invention will now be described. First, the light emitter 11 is operated by the driving and controlling unit 15, so that the light emitter 11 irradiates the light emitted in one direction toward the glass 13 having a predetermined thickness.

More than 90% of the emitted light of the light emitter 11 is transmitted by the transmitting and diffracting unit 12 formed internally or in one surface of the glass 13, and remaining emitted light is diffracted in constant ratio and diffraction angle, using diffraction phenomena.

In other words, the diffracted light is transmitted at a predetermined angle with respect to one plane of the glass 13.

Next, the diffracted light transmitted at a predetermined angle is reflected toward the emitted light at another predetermined angle by the reflection of the reflector 17.

At this time, the reflected light is irradiated at the angle so as not to be overlapped.

The thus-reflected light is sensitively detected by the detector 14 as a photo diode and is output as a predetermined electrical signal.

The signal output from the detector 14 is variably amplified in a constant strength by the driving and controlling unit 15, and is compared with the signal initially operating the light emitter 11 to control such emitter so that the emitted light of the light emitter 11 is maintained constantly.

A predetermined reflected light can also be induced by adjusting the transmitted angle of the diffracted light, instead of using the reflector 17 for reflecting the diffracted light. In other words, the predetermined reflected light is induced using reflection phenomenon whereby parts of the diffracted light are reflected at an angle to one plane of the glass 13, without the need of reflector 17 as a mirror.

The thus-reflected light is driven and controlled so that the emitted light of the light emitter 11 is maintained constantly by the aforementioned mechanism.

SECOND EMBODIMENT

Figure 4:
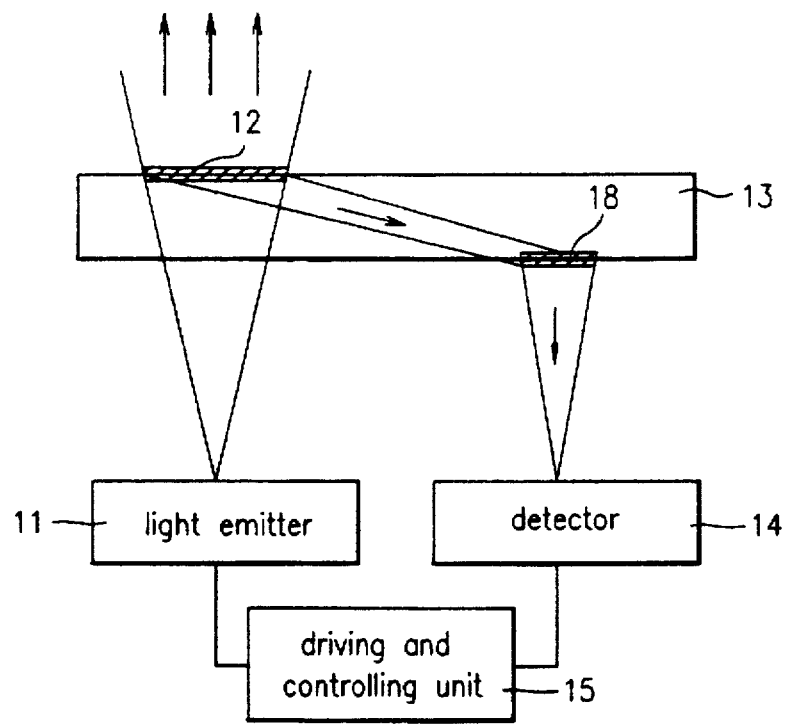
FIG. 4 is a schematic diagram of an optical output detector according to a second embodiment of the present invention.

As shown in FIG. 4, the optical output detector according to a second embodiment of the present invention includes a light emitter 11 for generating light emitted in one direction, a transmitting and diffracting unit 12 for transmitting most of the light emitted in one direction and diffracting parts of the emitted light, a glass 13 of a predetermined thickness, having the transmitting and diffracting unit 12 formed internally opposite to the light emitter 11 or in one surface thereof, a diffractor 18 opposed to the transmitting and diffracting unit 12 for diffracting and transmitting again the light reflected through the transmitting and diffracting unit 12 at a predetermined angle, a detector 14 for detecting the light diffracted and transmitted by diffractor 18, and a driving and controlling unit 15 for variably amplifying the light detected by the detector 14 in a constant strength, comparing the same with a signal for operating the light emitter 11 in an absolute ratio, and driving and controlling the emitted light of the light emitter 11 to be maintained constantly.

The operation of the present invention will now be described. First, the light emitter 11 is operated by the driving and controlling unit 15, so that the light emitter 11 irradiates the light emitted in one direction toward the glass 13 having a predetermined thickness.

More than 90% of the emitted light of the light emitter 11 is transmitted by the transmitting and diffracting unit 12 formed internally or in one surface of the glass 13, and remaining emitted light (less than 10%) is reflected by diffraction phenomenon.

In other words, the reflected light is reflected at a predetermined angle with respect to one plane of the glass 13.

Then, the reflected light is collected at the diffractor 18 and is wholly transmitted at a predetermined angle by diffraction.

The thus-diffracted light is sensitively detected by the detector 14 as a photo diode and is output as a predetermined electrical signal.

The signal output from the detector 14 is variably amplified in a constant strength by the driving and controlling unit 15, and is compared with the signal initially operating the light emitter 11 to control such emitter so that the emitted light of the light emitter 11 is maintained constantly.

Instead of reflecting light by the diffraction of the transmitting and diffracting unit 12, further using a mirror having a predetermined reflective index fixed internally or on one plane of a predetermined area of the glass 13.

The reflected light is collected at the diffractor 18 and is wholly transmitted at a predetermined angle by the diffraction. The respective reflected lights detected by the detector 14 are variably amplified by the driving and controlling unit 15 in a constant strength, is compared with the signal initially operating the light emitter 11 to then be driven and controlled so that the emitted light of the light emitter 11 is maintained constantly.

THIRD EMBODIMENT

Figure 5:
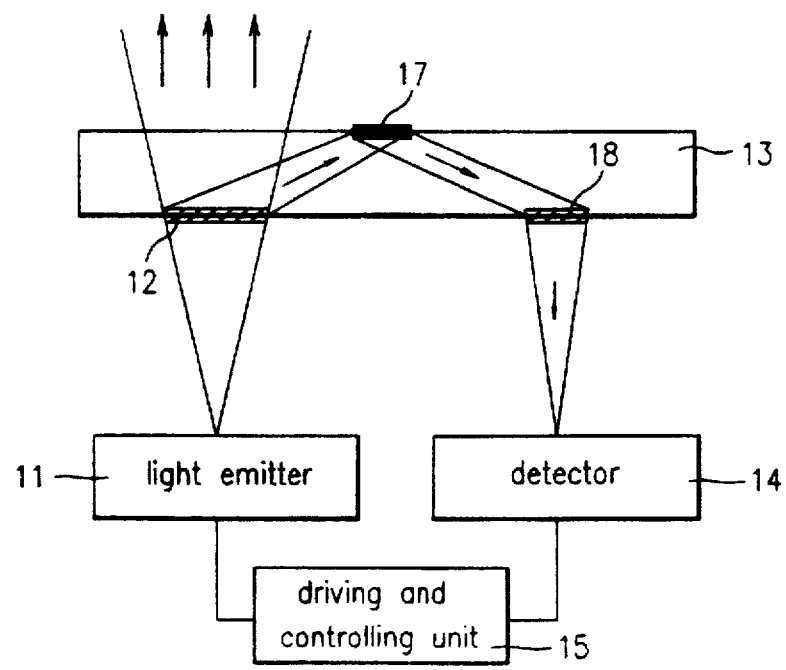
FIG. 5 is a schematic diagram of an optical output detector according to a third embodiment of the present invention.

As shown in FIG. 5, the optical output detector according to a third embodiment of the present invention includes a light emitter 11 for generating light emitted in one direction, a transmitting and diffracting unit 12 for transmitting most of the light emitted in one direction and diffracting parts of the emitted light, a glass 13 of a predetermined thickness, having the transmitting and diffracting unit 12 formed internally opposite to the light emitter 11 or in one surface thereof, a reflector 17 opposed to the transmitting and diffracting unit 12 formed on the glass 13, for reflecting the light diffracted from the transmitting and diffracting unit 12 at a predetermined angle, a diffractor unit 18 opposed to the reflector 17 formed on the glass 13, for diffracting the light reflected by the reflector 17 in a predetermined direction, a detector 14 for detecting the reflected light diffracted by the diffractor 18, and a driving and controlling unit 15 for variably amplifying the light detected by the detector 14 in a constant strength, comparing the same with a signal for operating the light emitter 11 in an absolute ratio, and driving and controlling the emitted light of the light emitter 11 to be maintained constantly.

The operation of the present invention will now be described. First, the light emitter 11 is operated by the driving and controlling unit 15, so that the light emitter 11 irradiates the light emitted in one direction toward the glass 13 having a predetermined thickness.

More than 90% of the emitted light of the light emitter 11 is transmitted by the transmitting and diffracting unit 12 formed internally or in one surface of the glass 13, and remaining emitted light is diffracted in a constant ratio by diffraction phenomenon.

The diffracted light is irradiated to the reflector 17 with a predetermined angle with respect to one plane of the glass 13.

Next, the diffracted light is reflected from the reflector 17 with a predetermined angle in a predetermined ratio by the reflection. The reflected light is irradiated at the angle so as not to be overlapped with the emitted light.

Then, the reflected light is collected at the diffractor 18 and is wholly transmitted at a predetermined angle by diffraction.

The thus-diffracted light is sensitively detected by the detector 14 as a photo diode and is output as a predetermined electrical signal.

The signal output from the detector 14 is variably amplified in a constant strength by the driving and controlling unit 15, and is compared with the signal initially operating the light emitter 11 to control such emitter so that the emitted light of the light emitter 11 is maintained constantly.

Further, of using the reflector 17 for reflecting the diffracted light, by adjusting the transmission angle of the diffracted light, total internal reflection occurs. In other words, the diffracted light is reflected at a predetermined angle to one plane of a predetermined area of the glass 13. Thus, by using such reflection phenomenon, the diffracted light is reflected without the need of reflector 17 as a mirror. Then, the reflected light is collected at the diffractor 18 and is wholly transmitted at a predetermined angle by the diffraction.

The thus-reflected light is driven and controlled so that the emitted light of the light emitter 11 is maintained constantly using the above-described mechanism.

Now, a preferred embodiment of the optical output detector according to the present invention, adopted to an optical recording disk playback apparatus, will be described.

Figure 6:
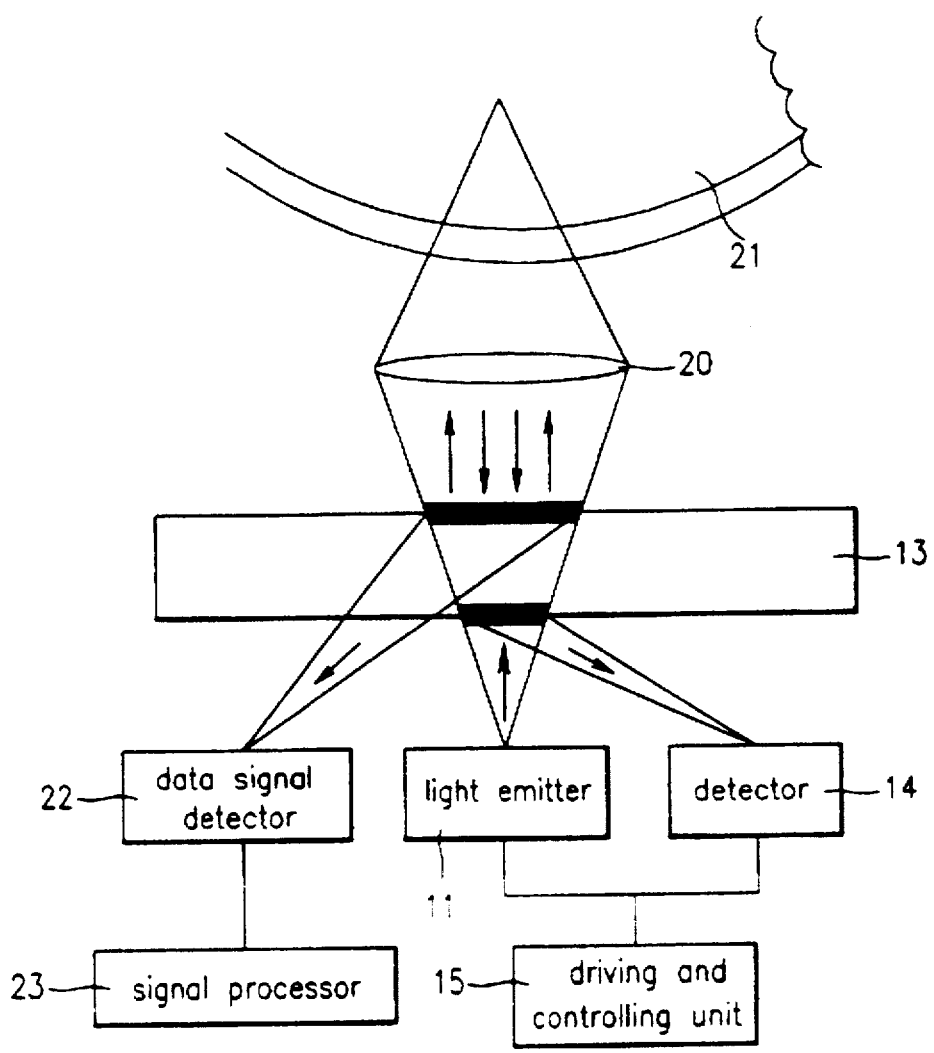
FIG. 6 is a detailed diagram of the optical output detector according to the present invention, adopted to an optical recording disk playback apparatus.

FIG. 6 is a detailed diagram of the optical output detector according to the present invention, adopted to an optical recording disk playback apparatus.

As shown in FIG. 6, the optical output detector according to the present invention, adopted to an optical recording disk playback apparatus, includes a light emitter 11 for generating front emitted light, a bi-directional transmitting and diffracting unit 12a having two transmitting and diffracting elements for transmitting the front emitted light and reflecting the same as diffracted and refracted light, and for transmitting again the transmitted light and transmitting the reflected light incident in a reverse direction by diffraction and refraction phenomena, a glass 13 having the bi-directional transmitting and diffracting unit 12 a fixed in incident plane of the emitted light, and formed integrally opposed thereto; an objective lens 20 for focusing the incident reflected light from the bi-directional transmitting and diffracting unit 12a or focusing the reflected light incident from the bi-directional transmitting and diffracting unit 12a, an optical recording disk 21 for generating optical data by reading data by the emitted light focused from the objective lens 20, a data signal detector 22 for detecting the optical data of the optical recording disk 21, diffracted from the bi-directional transmitting and diffracting unit 12a, a signal processor 23 for signal-processing the optical data detected from the optical recording disk 21, a detector 14 for detecting the reflected light by the diffraction and refraction of the emitted light from the bi-directional transmitting and diffracting unit 12a and generating an electrical signal, a driving and controlling unit 15 for variably amplifying the light detected by the detector 14 in a constant strength, comparing the same with a signal for operating the light emitter 11 in an absolute ratio, and driving and controlling the emitted light of the light emitter 11 to be maintained constantly.

Here, the light emitter 11 is a laser diode, the detector 14 is a photo diode, and the data signal detector 22 is a signal detecting photo diode array.

The operation of the optical recording disk playback apparatus adopting the present invention will now be described. First, the emitted light is generated by operating the light emitter 11, the emitted light is incident into the bi-directional transmitting and diffracting unit 12a.

Most of the emitted light is wholly transmitted through the glass 13 integrally formed with the bi-directional transmitting and diffracting unit 12a, and the remaining light is diffracted by one element of the bi-directional transmitting and diffracting unit 12a to then be reflected toward the detector 14.

Most of the transmitted light passing through the bi-directional transmitting and diffracting unit 12a in such a way is focused by the objective lens 20 to then be incident into the optical recording disk 21.

Next, the data stored in the optical recording disk 21 by the irradiated light is reflected in the form of light, and the data-form reflected light is reversely focused onto the objective lens 20 to then be diffracted at a predetermined angle by the other element of the bi-directional transmitting and diffracting unit 12a installed in one side of the glass 13.

If the light by the diffraction and refraction is laterally transmitted to have a predetermined angle, the light is transferred to the data signal detector 22.

The data signal detector 22 receives the light data and converts the same into an electrical data signal to then be output, which is processed as a picture or audio signal by the signal processor 23 to then be reproduced.

The emitted light of the light emitter 11, i.e., reflected light diffracted by one element of the bi-directional transmitting and diffracting unit 12a, is irradiated so as not to be overlapped with the light reflected by the other element of the bi-directional transmitting and diffracting unit 12a.

At this time, the transmission angle and reflection angle of the bi-directional transmitting and diffracting unit 12a are less than 90°, respectively. The thus-diffracted reflected light is sensitively detected by the detector 14 and is output as a predetermined electrical signal.

Next, the signal output from the detector 14 is variably amplified in a constant strength, is compared with a signal for operating the light emitter 11 in an absolute ratio, and is driven and controlled so that the emitted light of the light emitter 11 is maintained constantly, by the driving and controlling unit 15, thereby processing the optical data of the optical recording disk 21 to be stably read out.

As described above, according to the present invention, since a power monitoring photo diode is not necessitated, the cost can be reduced, and the fabrication process is simplified. Also, since it is not necessary to generate rear emitted light, the efficiency of a laser diode is improved, thereby processing optical data more stably. Further, the emitted light of a light emitter such as the laser diode can be maintained constantly in its light intensity, by a process for detecting an optical output in a simpler structure.

Therefore, the present invention can be adopted for an apparatus for maintaining the light intensity of emitted light to be constant.

What is claimed is:

1. An optical output detector comprising:

a light emitting portion for generating light emitted in one direction;

a transmitting and diffracting portion for transmitting most of said light emitted in one direction and diffracting parts of said emitted light;

a reflecting portion for reflecting said diffracted light;

a detecting portion for detecting said reflected light; and a driving and controlling portion for variably amplifying the output of said detecting portion, and maintaining the light of said light emitting portion constantly;

wherein said transmitting and diffracting portion is integrally formed in both planes of a glass having a predetermined thickness with a constant spacing.

2. An optical output detector as claimed in claim 1, wherein said transmitting and diffracting portion is integrally formed in both planes of a glass having a predetermined thickness with a constant spacing.

3. An optical output detector comprising:

a light emitting portion for emitting light in one direction;

a transmitting and diffracting portion for transmitting said light and diffracting the same in two directions;

a detecting portion for detecting said diffracted light beams divided in two directions; and a driving and controlling portion for amplifying the output of said detecting portion and maintaining the light of said light emitting portion constantly;

wherein one transmitted light beam and two diffracted light beams are separated in a constant separation ratio.

4. An optical output detector as claimed in claim 3, wherein the light diffracted in one direction by said transmitting and diffracting portion is reflected toward said detecting portion by reflection of a glass.

5. An optical output detector as claimed in claim 3, wherein the lights diffracted in two directions by said transmitting and diffracting portion are diffracted at a constant angle with respect to each other.

6. An optical output detector as claimed in claim 3, wherein one transmitted light beam and two diffracted light beams are separated in a constant separation ratio.

7. An optical output detector comprising:

a light emitting portion for emitting light in one direction;

a transmitting and diffracting portion for transmitting said light and diffracting the same in one direction;

a diffracting portion for diffracting again said diffracted light in one direction;

a detecting portion for detecting said secondly diffracted light; and a driving and controlling portion for amplifying the output of said detecting portion and maintaining the light of said light emitting portion constantly;

wherein said transmitting and diffracting portion is integrally formed in one plane of a glass having a predetermined thickness.

8. An optical output detector as claimed in claim 7, wherein said transmitting and diffracting portion is integrally formed in one plane of a glass having a predetermined thickness.

9. An optical output detector comprising:

a light emitting portion for generating front emitted light;

a bi-directional transmitting and diffracting portion for transmitting said light and diffracting the same in one direction, and transmitting again said transmitted light and diffracting again externally irradiated light in one direction;

an optical recording medium from which stored optical data is output as reflected light by said secondly transmitted light;

a lens for focusing said secondly transmitted light to then be irradiated into said optical recording medium, focusing the light reflected from said optical recording medium to then be irradiated into said transmitting and diffracting portion;

a data signal detecting portion for detecting said secondly diffracted light and outputting the same as an electrical signal;

a signal processing portion for signal-processing the output of said data signal detecting portion;

a detecting portion for detecting said diffracted light and outputting the same as an electrical signal; and a driving and controlling portion for variably amplifying the output of said detecting portion and maintaining the light of said light emitting portion constantly;

wherein said bi-directional transmitting and diffracting portion has two transmitting and diffracting elements and is integrally formed in both planes of a glass having a predetermined thickness with a constant spacing.

10. An optical output detector as claimed in claim 9, wherein said bi-directional transmitting and diffracting portion has two transmitting and diffracting elements and is integrally formed in both planes of a glass having a predetermined thickness with a constant spacing.

* * * * *